Patented Jan. 21, 1936

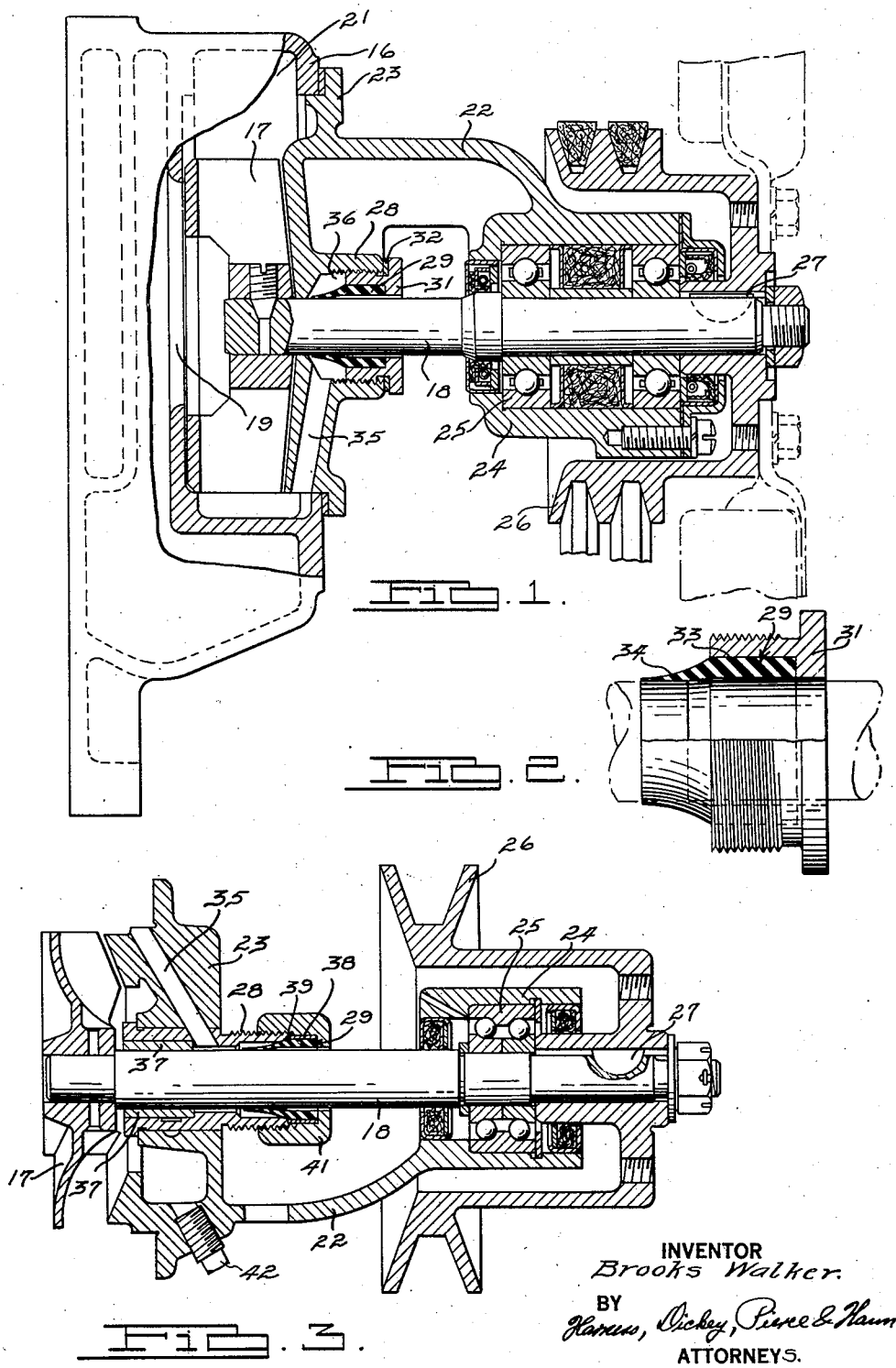

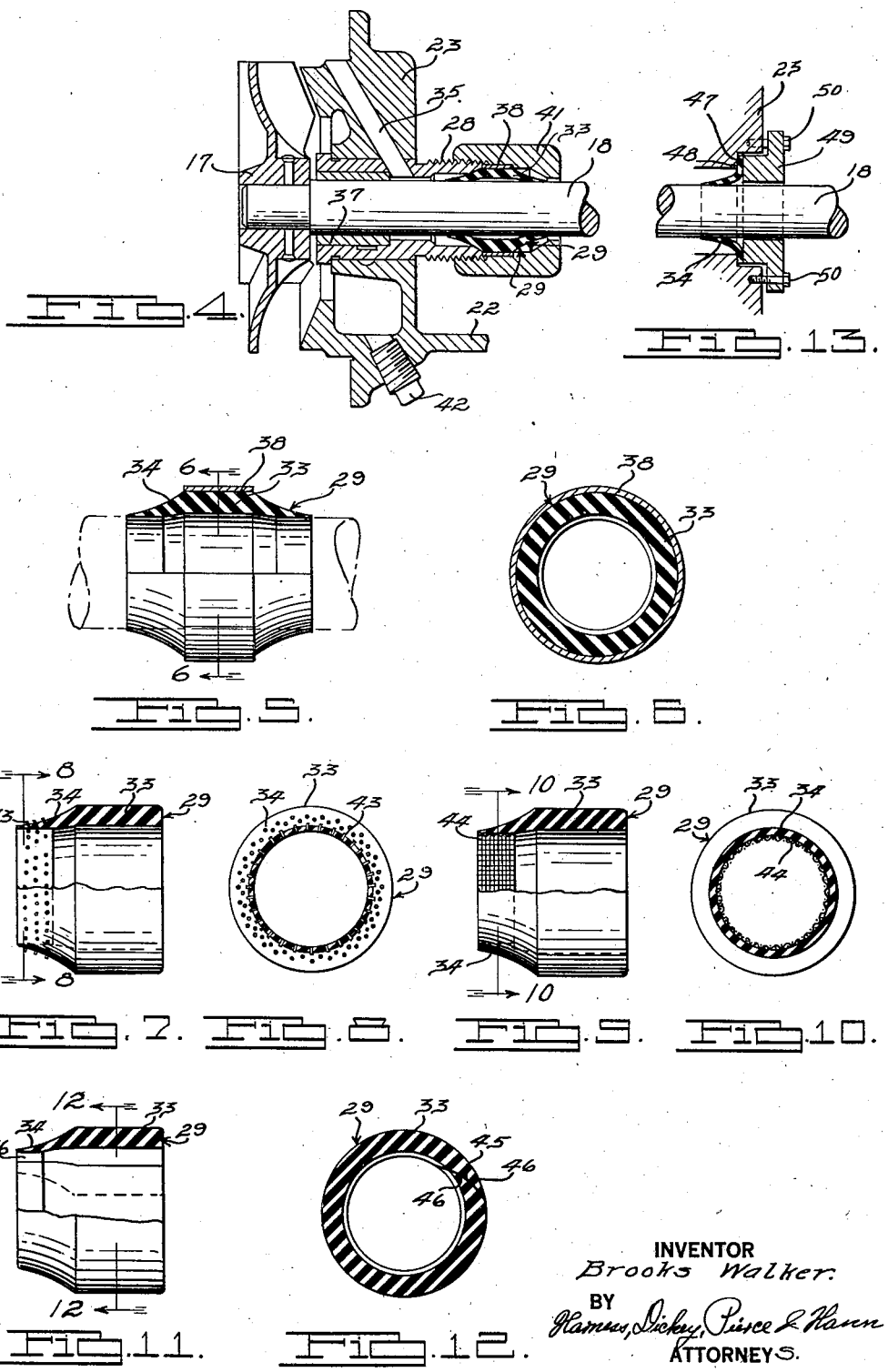

2,028,634

UNITED STATES PATENT OFFICE 2,028,634

FLUID PUMP PACKING

Brooks Walker, Oakland, Calif.

Application March 30, 1931, Serial No. 526,191

8 Claims. (Cl. 288—1)

My invention relates to packings for rotatable or reciprocatable shafts and particularly to a packing element which seals the shaft against the passage of a fluid because of the difference in pressure effected thereabout by an element which is associated with the shaft.

Difficulty has been experienced in the past when sealing means, in the nature of packing, was provided about the shaft of a pump, engine, compressor, or similar device, for preventing the leaking of a fluid about the shaft when the shaft was rotated or reciprocated. Should the shaft be bent or slightly off center, each rotation or reciprocation thereof, caused the packing to be distorted and worn unevenly and the seal, originally effected thereby, became destroyed and the fluid leaked past the packing. The replacement of the packing, or the tightening thereof in the stuffing box, would only effect a temporary seal as it would again become worn and leak the fluid.

In practicing my invention I provide a sealing member made of flexible material such as rubber, leather, felt, asbestos or other fibrous material or the like, which is spaced from the shaft at its body portion and which is provided with an extended lip portion which encompasses the shaft in such manner that a pressure, effected on the outer surface of the extension, causes the material thereof to be forced into intimate sealing engagement with the outer surface of the shaft.

For providing this pressure, I have illustrated my sealing member as being mounted on the shaft of a pump, the region about which is at considerably less pressure than that at the outermost periphery of the pump, because of the flow of fluid from the center toward the periphery. I provide a passage from the region of greatest pressure to the region of reduced pressure, at the surface of the shaft, in the vicinity of the sealing member, which forces the lip portion of the sealing member tightly against the shaft. I prefer to provide this passage of such diameter that the fluid supplied thereby to the surface of the shaft will be a greater amount than could flow about the shaft to the pump, to thereby provide a positive pressure in the region of the lip portion and to prevent air from being drawn in about the shaft into the fluid system. When such a pump is employed on the cooling system of an automobile the absence of air passing through the liquid will prevent the evaporation of a material, such as alcohol, which may be employed for lowering the freezing point of the water or other fluid.

Accordingly, the main objects of my invention are; to provide a packing element for sealing a shaft, the flexible extension of which encompasses and engages the shaft and is forced into sealing relation therewith by the pressure of a fluid on the outer surface of the extension; to provide a sealing element having lips at each end to effect a seal against a reversal of pressure; to provide a sealing element of the above type which is readily removable and replaceable; to provide a sealing element of the above type which is split longitudinally in such manner as to be overlapping and which may be sprung over a shaft to be sealed; to provide lubricating means for the flexible extension to eliminate the wear on its surface which contacts with the shaft, and to provide means for effecting a different pressure adjacent to the packing than exists further inside the pump along the pump shaft.

Other objects and features of novelty of my invention will be either specifically pointed out or will become apparent when referring, for a better understanding of my invention, to the following description, in conjunction with the accompanying drawings, wherein:

Figure 1 is a sectional view of a pump and driving means therefor in which a sealing element is provided for the pump shaft that embodies features of my invention.

Fig. 2 is an enlarged view, partly in section, of the sealing element shown in Fig. 1, Fig. 3 is a sectional view of a pump, similar to that shown in Fig. 1, having a sealing element therein which embodies a modified form of my invention.

Fig. 4 is a broken view of the pump shown in Fig. 3 illustrating a modified form which my sealing element may assume, Fig. 5 is an enlarged broken view, partly in section, of the sealing element shown in Fig. 4, Fig. 6 is a sectional view of the structure shown in Fig. 5, taken on the line 6—6 thereof, Fig. 7 is a view of the sealing element shown in the foregoing figures illustrating a method of effecting its lubrication, Fig. 8 is a sectional view of the structure shown in Fig. 7 taken on the line 8—8 thereof, Fig. 9 is a view of a sealing element similar to that of Fig. 7 showing a modified embodiment of the lubricating feature.

Fig. 10 is a sectional view of the structure shown in Fig. 9 taken on the line 10—10 thereof, Fig. 11 is a view of a sealing element similar to that shown in the foregoing figures, showing a further modified form thereof, Fig. 12 is a sectional view of the structure shown in Fig. 11 taken on the line 12—12 thereof, and Fig. 13 is a sectional view of a shaft and sealing means therefor which embodies a further modified form which my invention may assume.

Referring to Fig. 1, I have shown a pump of the conventional type including a housing 16 in which a rotor 17 is supported by a shaft 18 for drawing a fluid, such as water, through an aperture 19 and propelling it out through a conducting port 21. The shaft 18 is supported by a frame 22, having a flanged portion 23 for sealing the opening in the housing 16. The shaft 18 is supported in a boss 24, on ball bearings 25, and has a pulley 26 retained thereon by a key 27 by which the shaft is driven. A boss 28 extends from the flanged portion 23 of the frame 22 and is spaced from the shaft and provided with a thread on its inner surface for receiving a packing member for sealing the shaft against the flow of a fluid outwardly from the housing 16 across the surface of the shaft. The structure so far described is that conventionally employed in the art and of itself forms no part of my present invention.

For sealing the shaft against the leakage of the fluid, I provide a packing element 29 which is bonded to or otherwise supported on the inner surface of a flanged nut 31 having a thread which engages the thread on the inner surface of the boss 28. The nut 31 forms a water tight connection with the boss when screwed against a gasket 32 provided between the flange of the nut 31 and the outer end of the boss.

The packing element 29 and the flanged nut 31 are shown enlarged in Fig. 2 wherein the element is provided with a body portion 33 of cylindrical shape, the inner diameter of which is substantially greater than the diameter of the shaft to provide a clearance therebetween which prevents the body portion of the element from engaging the shaft. The extension 34 of the element tapers to a very thin cross section towards the shaft with its inner surface in engagement therewith for sealing the shaft against the passage of the fluid.

The outer surface of the body portion 33 of the element is bonded to the inner surface of the threaded nut 31, by vulcanizing or other suitable method, to constitute a unit structure with the nut. When so bonded the possibility of the body portion of the element being distorted to effect a rubbing engagement with the shaft is eliminated. The sealing element is made from a flexible material such as leather, rubber, fibrous material or the like, in order that the seal, effected by the extension 34 about the shaft, may be increased by the application of pressure about the surface of the extension 34 which is further contracted about the shaft.

Referring again to the pump illustrated in Fig. 1, it will be noted that the pump is of the centrifugal type wherein the fluid is drawn in through the aperture 19 and carried by centrifugal force to the ports 21 where it is passed through suitable conducting means to the radiator to be cooled. In this type of structure the area about the central portion of the rotor 17 is at less pressure than that at the ends thereof and the difference in pressure is taken advantage of in my present construction for increasing the sealing effect of the extension or lip 34. It is to be understood that I take advantage of any difference of pressure in a device having a shaft to be sealed which I utilize in combination with the sealing lip for effectively sealing the shaft. I provide a passage 35 which communicates from the region of higher pressure at the outer edge of the rotor 17 to the area of reduced pressure about the shaft 18. The area of the passage is such that it is larger than the leakage area about the shaft at the point where the shaft extends through the flanged portion 23 to thereby effect a positive pressure in the space 36 provided adjacent to the packing element. This pressure extends over the entire outer surface of the lip 34, which is forced into intimate engagement with the shaft to thereby effectively seal the shaft against the passage of the fluid, irrespective of whether or not the shaft is bent or is out of axial alignment with the bearing and whether or not the shaft is mounted for rotational or reciprocable movement.

In Fig. 3, I have shown a pump having its shaft mounted in a similar manner to that of the shaft shown in Fig. 1 with the exception that a second bearing 37 is provided adjacent to the rotor end of the shaft within the flange portion 23 of the frame 22. The provision of the bearing has substantially no effect upon the sealing of the packing element 29, since the pressure of the fluid is conducted adjacent to the outer surface of the lip thereof through the passage 35 in the same manner as that provided in the structure of Fig. 1. It may be advisable however, to provide a slight enlargement in the passage, for the purpose of allowing for the wear that will occur between the engaging surface of the bearing 37 and the shaft 18, so that a positive pressure may at all times be built up about the lip of the packing element. The passage of fluid through the bearing reduces the wearing of the surface because of the cooling effect of the fluid and because the presence of the film of fluid between the bearing surface and that of the shaft functions in the nature of a lubricant and in this connection the passage forms the useful function of assuring a fluid flow through the bearing for lubrication and also for subjecting the packing to a pressure in one direction only in many applications.

The packing element 29 is vulcanized or otherwise secured to a ring 38 to thereby provide a unit which is replaceable without the necessity of supplying an entire new nut 31 as would be the case when the structure in Fig. 1 is employed wherein the packing element is secured directly to the nut. The ring 38 may be metal or other substantially non-resilient material such as hard rubber to which the rubber packing element 29 may be readily vulcanized. The ring 38 abuts against the outer edge 39 of the extension 28, to form a seal therewith to prevent the escape of the fluid outwardly through the threads of the enclosing nut 41.

The sealing element 29 is thus readily renewable and in Fig. 5, is shown as being provided with two lips or extensions 34. It is to be understood that the ring 38 may be mounted on the body portion of the element 29 when a single lip is employed, as illustrated in Fig. 3.

The double lip sealing element is preferably employed on a shaft about which the pressure may reverse, that is to say having increased and reduced pressures at various times effected by the operation of the pump or similar device.

The double lipped element is mounted on the shaft in the same manner as that of the single lipped element, the body portion 33 of the element being out of engagement with the shaft which is engaged only by the inner surface of the flexible extending or lip portion of the elements. The ring 38 abuts against the end 39 of the boss 28 in the same manner as that above described in relation to the structure of Fig. 3, for sealing the threads from the fluid when the nut 41 forces the ring 38 against the edge of the boss.

In Figs 3 and 4 a drain plug 42 is shown threaded into the bottom of the flanged portion 23 for the purpose of draining the fluid from the system and particularly about the rotor 17 for preventing the fluid from freezing thereabout in cold weather which would prevent its rotation.

The tight seal thus effected by the application of pressure on the outer surface of the extension or lip 34 of the packing element 29, may prevent a lubricant, or a portion of the fluid from providing a film between the packing element and the surface of the shaft, the absence of which may cause the sealing element to run hot, become distorted or destroyed. In Figs. 7 and 8 I have shown a plurality of threads 43 extending through the lip 34 of the sealing element 29, the outer portion of which is in contact with the fluid while the inner portion engages the surface of the shaft. The threads are preferably cotton or a fibrous material and function in the nature of a lamp wick for causing the fluid to pass through the threads by capillary action to moisten and lubricate the engaging surfaces of the shaft and the lip.

In Figs. 9 and 10 I have shown an annular wick-like member 44 attached to the inner surface of the lip 34, of the element 29, to be positioned between the lip and the surface of the shaft. The fluid is soaked through the member 44 from the outer edge of the lip for the purpose of retaining the engaging surface moistened to lubricate the shaft. The wick is made thin as shown in the figure and is flexible in order not to interfere with the flexing of the lip 34 to force the wick into tight engagement with the shaft. It is to be understood that it is within the purview of the present invention to employ an element 29 made of a rubber, fibrous or other material having a lubricant such as paraffin, graphite or the like embodied therewithin, so that the element may provide its own lubrication to prevent heating between the surface of the lip and shaft.

In order to have my packing element readily removable and replaceable on a shaft, I have shown in Figs. 11 and 12 an element 29 having a longitudinal slot 45 disposed diagonally across the body and lip portions of the element. The diagonal disposition of the slot effects overlapping portions 46 which constitute a seal when the element is supported about the shaft. It is to be understood that the overlapping portion 46 may be of greater length than that shown in the figures and may be provided of such length as to extend entirely around the shaft. That is to say, that the elements may be formed in a strip and wound two or more times around the shaft, in which construction, a pair of lips would overlap the other, the inner lip sealing the shaft and the outer lip sealing the outer surface of the inner lip from the egress of the fluid. It is also within the purview of my invention to provide two sealing members, one disposed within the other and have the split sides thereof disposed in diametrically opposite relation and have the lip portion of the outer member extend beyond the lip portion of the inner member, to have both lip portions engage the shaft and be sealed circumferentially through the opposite disposition of the slots.

It is to be understood that the elements shown in Figs. 11 and 12 may be provided with the annular ring 38 which would be constructed of a resilient material to be capable of being spread to a width equal to that of the shaft without being substantially distorted and which would thereby be sprung against the inner surface of the enclosing nut 41 and the body portion of the element would be drawn out of contact with the surface of the shaft. The overlapping portion 46 of the body and lip portions would constitute a seal to prevent the leakage of the fluid through the slot.

In Fig. 13 I have shown a modified form of my packing element wherein the lip portion is extended to constitute a washer like portion 47 which is clamped against a shoulder 48 of the flanged portion 23 by a head 49 which is drawn against a flanged portion by bolts 50. In this construction, the washer portion 47 seals the pump from leakage through the flange portion 23 otherwise than about the shaft and the lip portion 34 thereof seals the shaft in the same manner as the seal was effected by the lip portion of the element heretofore described. This type of sealing structure may employ the double lips disposed in opposite directions, similar to the two lip sealing structures shown in Fig. 5, if desirable, and may be advantageously employed, owing to its particular holding feature, when the sealing structure is made from a material which is difficult or expensive to bond to a member as previously described.

While I have specified that the packing element 29 may be made of rubber, leather or like material, it is to be understood that any material capable of being forced into engagement with the surface of the shaft may be employed, either of the two materials specifically mentioned being advantageously employed under certain conditions. The leather will, of itself, pass sufficient of the fluid through the lip to lubricate the surface thereof in contact with the shaft because of its porosity and the lubricating means hereinabove mentioned may thereby be dispensed with. However the leather can only be employed as a seal for a fluid up to a certain temperature above which the leather becomes soggy and useless as a sealing means. However a vegetable fiber such as cotton or a mineral fibre base, as asbestos, may be employed where the fluid to be sealed becomes heated. The rubber sealing element may be advantageously employed on a pump of a type herein shown for circulating a fluid through the water system of an internal combustion engine, because of its ability to withstand the rise in temperature which may occur in the system.

While I have described and illustrated several embodiments of my invention it will be apparent to those skilled in the art that various changes, additions, substitutions and omissions may be made therein without departing from the spirit and scope of my invention, as set forth in the accompanying claims.

I claim as my invention:

1. A packing element for self sealing a shaft against the pressure of a fluid having a body portion out of contact with the shaft, a flexible tapered lip portion engaging the surface of the shaft and integral means within said lip portion of said element for effecting its lubrication relative to the surface of the shaft.

2. A lip seal packing for a shaft including a compound of rubber and provided with integral auxiliary means for inducing a fluid to flow between the packing and shaft by capillary attraction.

3. A sealing ring made from a compound of rubber and shaped to engage and seal a shaft of a fluid pump, means for inducing a flow of fluid to the engaging surfaces thereof including a fibrous passage from the pump fluid to the surface of said shaft engaged by said ring.

4. A packing element for sealing a driven shaft against the pressure of a fluid and having a body portion supported by a rigid member said packing element tapered at one end to form a flexible lip portion, the inner and outer diameters of said lip portion being substantially less than the inner and outer diameters, respectively, of the packing element at any point within the confines of said rigid member.

5. A packing element for sealing a driven shaft against the pressure of a fluid having a cylindrical body portion entirely out of contact with the shaft and of reduced diameter at one end to form a flexible lip portion in engagement with the surface of the shaft and in longitudinal extension of said body portion.

6. A packing element for sealing the driven shaft against the pressure of a fluid having a body portion entirely out of contact with the shaft, and one end of less diameter to provide a flexible lip portion in longitudinal extension of said body portion engaging the surface of the shaft, said lip portion tapering to a thin edge and extending toward the pressure end of said shaft with its outer surface exposed to the fluid pressure and normally exerting an elastic pressure against the surface of the shaft.

7. A packing for sealing a driven shaft including a pressure ring of resilient material bonded to a substantially solid outer portion, the inner diameter of the packing being greater than the shaft diameter within the confines of said solid outer portion, the portion extending beyond said ring forming a flexible lip in engagement with said shaft.

8. A sealing element for a driven shaft having a body portion and a thin lip portion of less diameter than said body portion made from a flexible material and a member bonded to the body portion of said element for retaining it out of engagement with said shaft, within the confines of said member.

BROOKS WALKER.